United States Patent [19]

Bögert et al.

[11] Patent Number: 5,735,926
[45] Date of Patent: Apr. 7, 1998

[54] APPARATUS FOR THE DRIVING OF PLUNGERS IN A FEEDER OF A GLASS FORMING MACHINE

[75] Inventors: Hermann Bögert, Auetal; Gerhard Geisel, Bückeburg; Heinz Hermening, Porta Westfalica, all of Germany

[73] Assignee: The Firm Hermann Heye, Obernkirchen, Germany

[21] Appl. No.: 600,937

[22] PCT Filed: Feb. 18, 1995

[86] PCT No.: PCT/EP95/00588

§ 371 Date: Feb. 21, 1996

§ 102(e) Date: Feb. 21, 1996

[87] PCT Pub. No.: WO96/00192

PCT Pub. Date: Jan. 4, 1996

[30] Foreign Application Priority Data

Jun. 23, 1994 [DE] Germany .............. 9410301 U

[51] Int. Cl.⁶ .............. C03B 11/06; C03B 5/26; C03B 7/00; C03B 5/28
[52] U.S. Cl. .............. 65/362; 65/328; 65/330; 65/126
[58] Field of Search .............. 65/330, 331, 328, 65/325, 362, 126, 129, 221

[56] References Cited

U.S. PATENT DOCUMENTS

| | | |
|---|---|---|
| 1,596,438 | 8/1926 | Lorenz . |
| 1,645,221 | 10/1927 | Barker, Jr. .............. 65/126 |
| 1,657,640 | 1/1928 | Peiler .............. 65/126 |
| 2,725,681 | 12/1955 | Wythe .............. 65/330 |
| 2,749,665 | 6/1956 | Peiler .............. 65/330 |
| 3,201,218 | 8/1965 | Wythe .............. 65/330 |
| 4,551,163 | 11/1985 | Duga et al. .............. 65/330 |

FOREIGN PATENT DOCUMENTS

| | | |
|---|---|---|
| 514112 | 11/1930 | Germany . |
| 4231455 | 3/1994 | Germany . |
| 4239725 | 6/1994 | Germany . |
| 9410301 U | 9/1994 | Germany . |

OTHER PUBLICATIONS

*Patents Abstracts of Japan*, C-665 Dec. 13, 1989 vol. 13/No. 562, Method for supplying Glass Gob, 1-234335(A).

Primary Examiner—Donald E. Czaja
Assistant Examiner—Jacqueline A. Ruller
Attorney, Agent, or Firm—Synnestvedt & Lechner

[57] ABSTRACT

The apparatus comprises at least one plunger (2) and a plunger holder (3) which can be raised and lowered. An arm (18) of a tilt lever (17) is coupled to the plunger holder (3). A link member (22) of a drive system (23) cooperates with the other arm (20) of the tilt lever. The link member (22) is adjustable along said other arm (20) in order to change the stroke of the plunger. The drive system (23) comprises an electric servodrive with a take-off shaft (13), the drive being connected to the link member (22) and being controllable by electronic control means. The link member (22) is arranged on a tie rod (26) which at one free end is coupled (28) to a pivot lever (27) which is mounted fixedly in relation to the apparatus. At a central coupling point (30) of the pivot lever (27) is coupled a push rod (32) whose other end is coupled to a crank (14) of the take-off shaft (13).

19 Claims, 3 Drawing Sheets

5,735,926

APPARATUS FOR THE DRIVING OF PLUNGERS IN A FEEDER OF A GLASS FORMING MACHINE

BACKGROUND

1. Field of the Invention

The invention relates to glass forming machines, and more particularly to an apparatus for driving a plunger of a glass forming machine into and out of a feeder head for effecting the outflow of molten glass.

2. Description of Related Art

In one known apparatus of this type (DE 42 31 455 A1) the take-off shaft is connected by means of a coupling to a coaxial threaded spindle which is in threaded engagement with the rotationally fixed link member which is longitudinally displaceable on the tilt lever. The servodrive is mounted on a horizontal shaft which is fixed in relation to the apparatus so as to be movable upwards and downwards as a whole. In each operating cycle the servodrive drives the threaded spindle back and forth reversibly. The result of this is extra expenditure on control and increased wear in the drive system.

From DE 42 39 725 A1 it is known, in an apparatus according to the aforesaid DE 42 31 455 A1, to form the link member as a clamping member with a setting drive which can be tightened to the tilt lever (rocker arm). Moreover, here the longitudinal displacement of the clamping member along the tilt lever is no longer effected by a hand crank but is motorized and effected by an adjusting device having a setting drive.

From German patent specification DE 514 112, U.S. Pat. No. 1,596,438 A and JP 1-234 335 A (Patent Abstracts of Japan, C-665, Dec. 13, 1989, Volume 13/No. 562) an apparatus is known which is essentially the same as that described as part of the state of the art in the aforesaid DE 42 31 455 A1 at column 1, lines 12 to 36.

SUMMARY OF THE INVENTION

It is the object of the invention to improve the drive system for the plunger.

This object is achieved by the features of the invention which provides a new and novel apparatus for the motorized lifting of a plunger which is movable into and out of a feeder head of a feeder for a glass forming machine. The apparatus includes a tilt lever mounted for a rising and falling movement on a horizontal bearing shaft which is fixed relative to the apparatus. The tilt lever has one arm coupled to a plunger holder which can be raised and lowered, and has another arm.

A link member is provided with which the other arm of the tilt lever cooperates. The link member is adjustable along the other arm to change the stroke of the plunger. A drive system has an electric servodrive which has a take-off shaft. The servodrive is connected to the link member and controllable by electronic control means. The servo drive is fixed relative to the apparatus. Fixed to the take-off shaft of the servodrive is a crank. The link member is arranged on a tie rod which is coupled at a coupling point to a free end of a pivot lever. The pivot lever is mounted at a bearing point fixed in relation to the apparatus. Coupled to the pivot lever between the bearing point and the coupling point of the pivot lever is a push rod having a first end. The push rod has a second end coupled to the crank.

The electric servodrive can comprise an electric servomotor or an electric servomotor and a subsequent gear transmission. The drive system is designed to be comparatively simple and functionally reliable. Existing gob feeders for glass forming machines can be equipped with the drive system of the present invention at minimal cost.

BRIEF DESCRIPTION OF THE DRAWINGS

These and other features and advantages of the invention will now be described in more detail with reference to the embodiments which are described hereinafter by way of example and which are shown in the drawings. In the drawings.

DETAILED DESCRIPTION OF THE INVENTION

Figure 1:
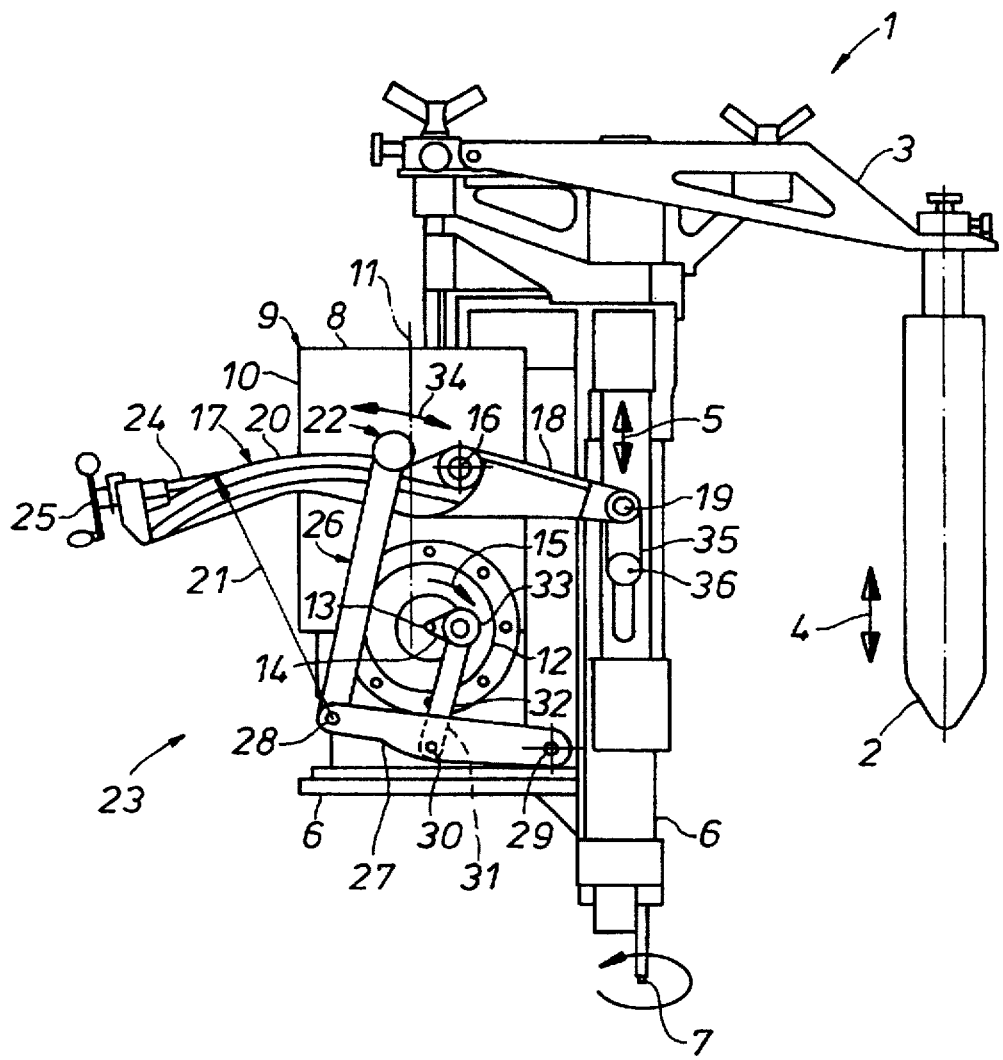
FIG. 1 is a side view of a plunger mechanism.

FIG. 1 shows a plunger mechanism 1 in which at least one plunger 2 is suspended from a plunger holder 3 and is movable in the vertical directions as indicated by a double-headed arrow 4. Each plunger 2 dips into a feeder head, which is known per se and which is not illustrated, of a feeder for a glass forming machine 1 and effects the outflow of the molten glass from the feeder head and the formation of glass gobs for the subsequent glass forming machine. Since this process is known per se, an illustration of it within the framework of the present application can be dispensed with.

The plunger holder 3 is mounted for displacement in the vertical directions, as indicated by a double-headed arrow 5, on a stationary frame 6 of the plunger mechanism 1. At 7 ensues a base adjustment for the height of the at least one plunger 2.

On the frame 6 is mounted a housing 8 of an electric servodrive 9. The servodrive 9 comprises an electric servomotor 10 having a vertical longitudinal axis 11 and a subsequent gear transmission 12 having a horizontal take-off shaft 13. These features help save space. The gear system, for example, can be formed as a wormgear.

A crank 14 is fixed to the take-off shaft 13. The crank is rotatable always in the same direction of rotation 15. This feature brings about the particular advantage that the double reversal of the servomotor 10 in each operating cycle, which is necessary in prior art systems, is avoided. In each operating cycle, the crank is halted only at its lower dead point for synchronization with the feeder operation thereby maintaining the synchronization of the feeder in a simple manner.

The housing 8 carries a horizontal bearing shaft 16 on which a tilt lever 17 is mounted for rising and falling movement. The plunger holder 3 is coupled to one arm 18 of the tilt lever 17 at a coupling point 19. The other arm 20 of the tilt lever 17 is arcuate and has a radius 21. A link member 22 of a drive system 23 for changing the stroke of said at least one plunger 2 is adjustably movable along the other arm 20. Its adjustment is effected by a threaded spindle 24 which is rotatable by means of a hand crank 25 and which is in threaded engagement with the link member 22. The threaded spindle 24, before lengthwise movement, is secured in relation to the said other arm 20.

The link member 22 is fixed to a tie rod 26 which is coupled to a free end of a pivot lever 27 at a coupling point 28. The radius 21 originates from this coupling point 28. The pivot lever 27 is mounted for rising and falling movement at a bearing point 29 which is fixed in relation to the apparatus. Between the bearing point 29 and the coupling point 28 is coupled a first end 31 of a push rod 32 at a coupling point 30. A second end 33 of the push rod 32 is coupled to the crank 14 at a radial distance from the longitudinal axis of the take-off shaft 13.

A rotation of the crank 14 in the direction of rotation 15 as shown in FIG. 1 has the result that the push rod 32 is forced downwards and sinks the pivot lever 27 in the counterclockwise direction. Thereby, the tie rod 26 is forced downwards and pivots the tilt lever 17 in the counterclockwise direction, with the result that the plunger holder 3 and consequently the at least one plunger 2 are automatically raised.

If the stroke of the plunger movement is to be changed, then the hand crank 25 is correspondingly turned and the link member 22 is adjusted in a direction of the double-headed arrow 34 into the desired new position along the other arm 20 of the tilt lever 17.

Preferably, the coupling point 19 is not directly coupled to a coupling point 36 of the plunger holder 3, but via a link 35. In this way, the movement of the coupling point 19 on an arc centered on the bearing shaft 16 can be compensated in a very simple manner.

Figure 2:
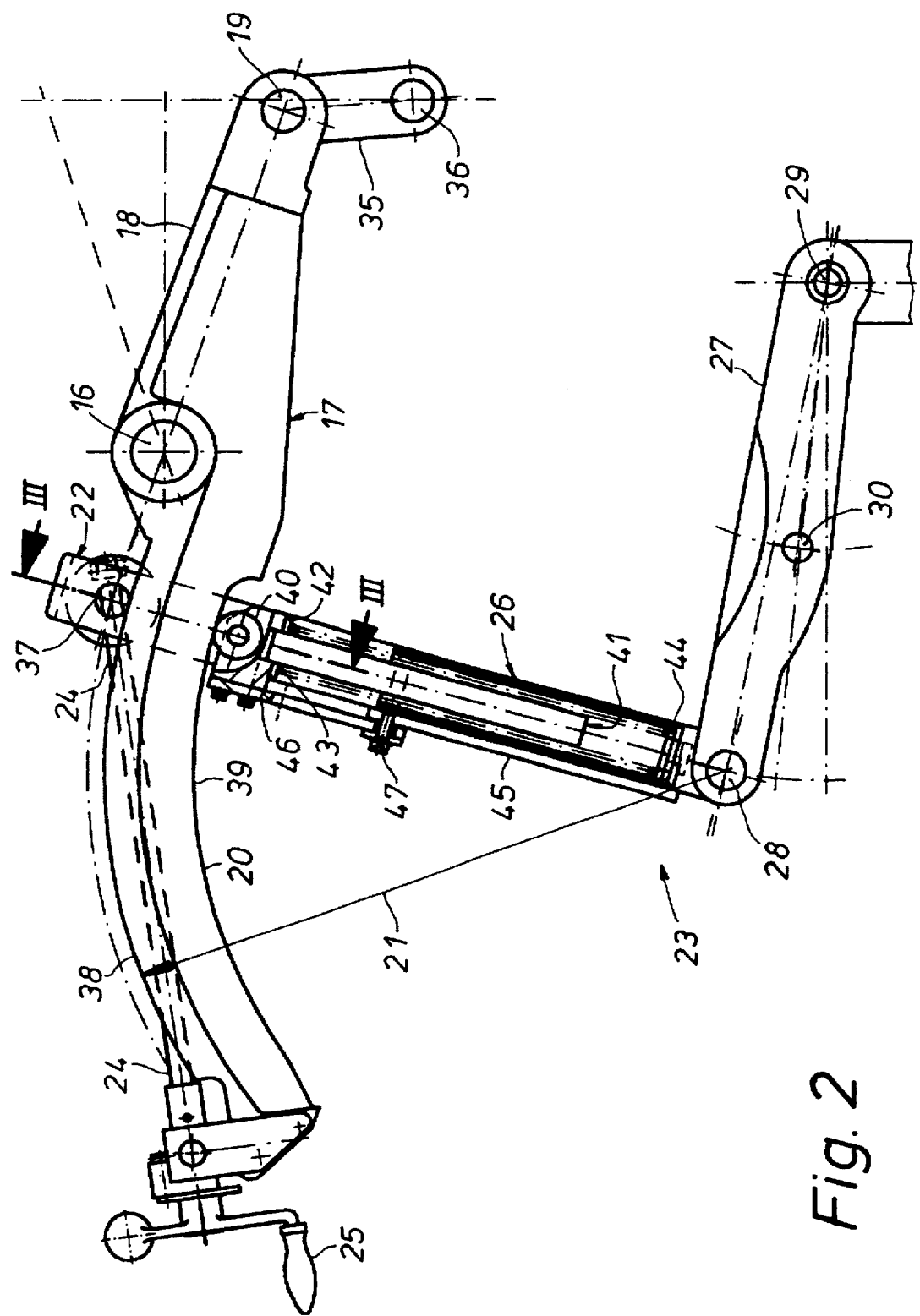
FIG. 2 is a side view, on an enlarged scale and partly in longitudinal section, of a part of the drive system shown in FIG. 1.

In FIG. 2 a circular sliding element 37 of the link member 22 can be seen. The sliding element 37 is adjustably displaceable by means of the threaded spindle 24 on a slider track 38 of the tilt lever 17, with the slider track in this case being an arcuate track. This provides a particularly simple and functionally reliable adjustment of the stroke for the plunger.

On its lower side, which is opposite the slider track 38, the tilt lever 17 is provided with an auxiliary track 39. A pressure member 40 of the tie rod 26 which is movable in the axial direction relative to the rest of the tie rod 26 is pressed against the auxiliary track 39. Thus the sliding element 37 is held in contact with the at least one sliding track 38 in a non-positive manner. Simultaneously, there is an elasticity for the case where resistance maybe encountered at any point of the drive system. The pressure member 40 is in this case formed as a roller which is freely rotatable on a shaft 41 which extends downwards into the tie rod 26. A compression spring 43 is seated against the underside of an external flange 42 on the shaft 41. At its lower end the compression spring rests on the base 44 of a lower part 45 of the tie rod 26.

An upper part 46 of the tie rod 26 is adjustable in the axial direction relative to the lower part 45 by means of an adjustment device 47. By this means the effective axial length of the push rod 26 can be influenced.

Figure 3:
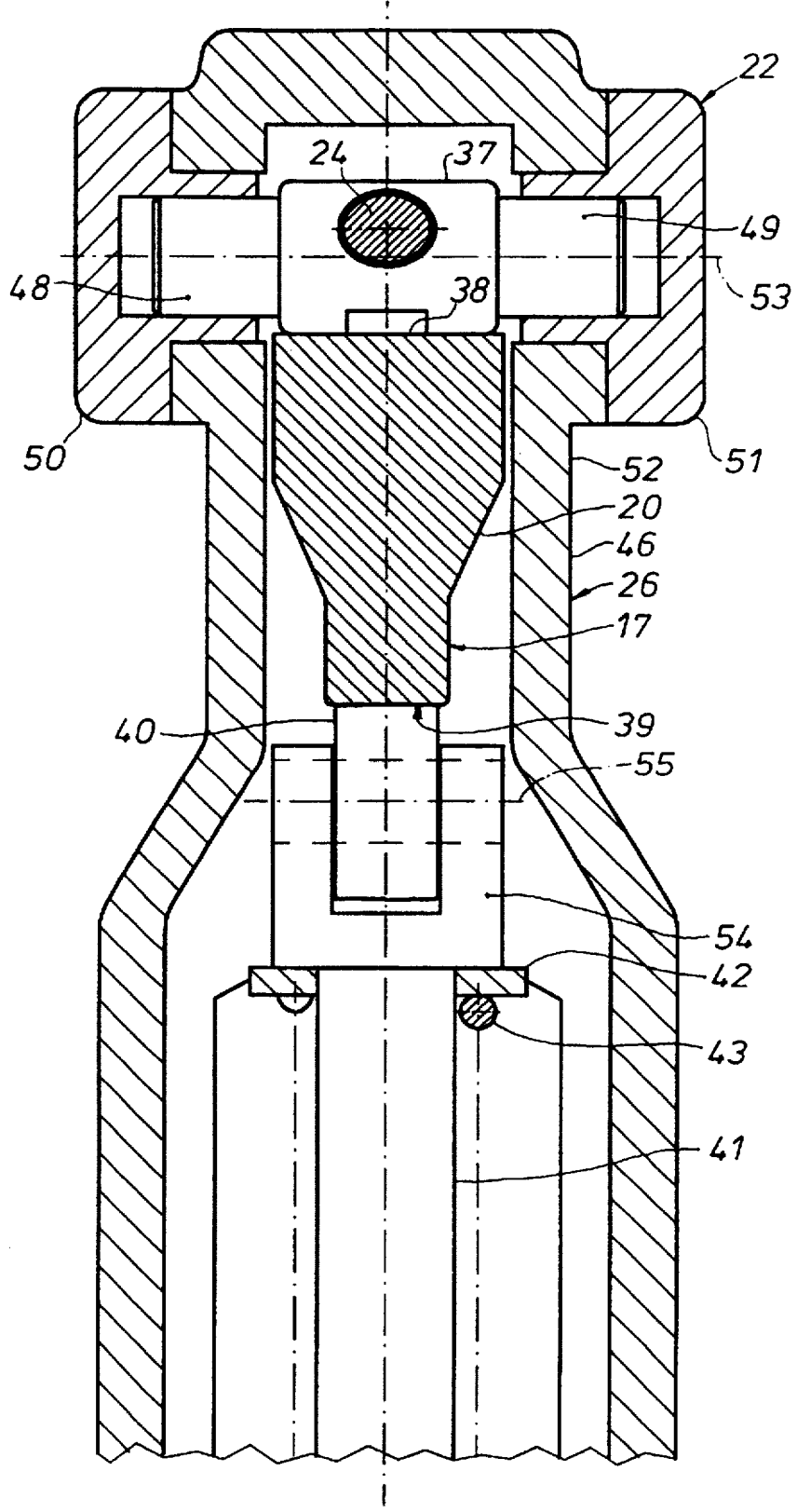
FIG. 3 is essentially the sectional view taken along the line III—III in FIG. 2, on a further enlarged scale.

FIG. 3 shows further details of the arrangement shown in FIG. 2, on an enlarged scale and in slightly modified form. The same components are provided with the respective same reference numerals.

The slider element 37 is mounted for rising and falling movement about a horizontal axis 53 by means of lateral bearing pins 48 and 49 which are seated in plugs 50 and 51 of a housing 52 which encompasses the tilt lever 17. With these features one has a particularly reliable mounting of the sliding element 37 on the link member 22.

The pressure member 40, formed as a roller, is mounted for rotation about a horizontal axis 55 in an upper fork 54 of the shaft 41.

What is claimed is:

1. Apparatus for the motorized lifting of at least one plunger which is movable into and out of a feeder head of a feeder for a glass forming machine, said apparatus comprising:

a tilt lever mounted for rising and falling movement on a horizontal bearing shaft which is fixed relative to the apparatus, said tilt lever having one arm coupled to a plunger holder which can be raised and lowered, and another arm;

a link member with which said other arm of said tilt lever cooperates, said link member being adjustable along said other arm to change the stroke of the plunger;

a drive system comprising an electric servodrive having a take-off shaft, said servodrive being connected to said link member and controllable by electronic control means, and said servodrive being fixed relative to the apparatus;

a crank fixed to the take-off shaft of said servodrive;

a tie rod on which said link member is arranged;

a pivot lever mounted at a bearing point fixed in relation to the apparatus, said tie rod being coupled at a coupling point to a free end of said pivot lever; and a push rod having a first end coupled to said pivot lever between said bearing point and said coupling point of said pivot lever, and a second end coupled to said crank.

2. Apparatus according to claim 1 wherein the servodrive comprises an electric servomotor with a vertical longitudinal axis and a subsequent gear transmission with a horizontal take-off shaft.

3. Apparatus according to claim 1 wherein the crank is rotatable always in the same direction of rotation.

4. Apparatus according to claim 1 wherein the crank can be held at its bottom dead point in each operational cycle for a dwell period for synchronization with the feeder operation.

5. Apparatus according to claim 1 wherein the bearing shaft of the tilt lever is arranged on a housing of the servodrive which housing is fixed in relation to the apparatus.

6. Apparatus according to claim 1 wherein the link member comprises a sliding element which is adjustably displaceable on at least one upward facing sliding track of the tilt lever.

7. Apparatus according to claim 6 wherein the sliding element is mounted for rising and falling movement in a housing of the link member which encompasses the tilt lever.

8. Apparatus according to claim 6 wherein the tilt lever is provided at its side which lies opposite to said at least one sliding track with at least one auxiliary track, and the tie rod has a pressure member which is movable relative to the rest of the tie rod and which is pressed against said at least one auxiliary track.

9. Apparatus according to claim 8 wherein the pressure member is pressed against said at least one auxiliary track by means of a spring which is connected to the rest of the tie rod.

10. Apparatus according to claim 1 wherein the effective length of the tie rod is adjustable.

11. An apparatus for lifting at least one plunger used with a glass forming machine, said apparatus comprising:

a plunger holder adopted to hold the plunger;

a tilt lever pivotally mounted to said apparatus for rising and falling movement, said lever having one arm which is coupled to said plunger holder for raising and lowering the plunger holder, and an other arm which moves in the opposite direction of said one arm;

a link member cooperating with said other arm of said tilt lever to move with said tilt lever, said link member being adjustable along said other arm to change the stroke of the plunger;

a drive system having a rotating shaft;

a push rod having first and second ends, said second end coupled to said drive system to be moved in an orbital-like motion;

a pivot lever having one end pivotally mounted to said apparatus, and a free end moveable up and down relative to said pivotally mounted end, said pivot lever being coupled to said first end of said push rod to be moved thereby; and a tie rod having one end coupled to said free end of said pivot lever to be moved thereby, said link member being arranged on said tie rod whereby movement of said tie rod moves said tilt lever.

12. An apparatus in accordance with 11 wherein said drive system comprises an electric servomotor controllable by electronic control means and connected to said shaft, said shaft comprising a take of shaft which is coupled to said push rod by a crank fixed to said take-off shaft.

13. An apparatus in accordance with claim 12 comprising means to hold said crank at a bottom dead point in each operational cycle for a dwell period for synchronization with the operation of the glass forming machine.

14. An apparatus in accordance with claim 11 wherein said tilt lever is pivotally mounted to said apparatus by a horizontal bearing shaft fixed to said apparatus.

15. An apparatus in accordance to claim 11 wherein said tilt lever comprises at least one upward facing sliding track, and said link member comprises a sliding element which is adjustably displaceable on said upward facing sliding track.

16. An apparatus in accordance with claim 15 further comprising a link member housing encompassing said tilt lever in which said sliding element is mountable for rising and falling movement.

17. An apparatus in accordance with claim 15 wherein said tilt lever comprises at least one auxiliary track on its side which lies opposite to said sliding track, and said tie rod comprises a pressure member which is moveable relative to the rest of the tie rod is pressed against said auxiliary track.

18. An apparatus in accordance with claim 17 comprising a spring for pressing said pressure member against said auxiliary track.

19. An apparatus in accordance with claim 11 wherein the effective length of said tie rod is adjustable.

* * * * *